Dec. 11, 1945.   H. J. WILLIAMS   2,390,977
EVENING ROLL FOR FLOW BOXES
Filed April 16, 1941

INVENTOR
HERMAN J. WILLIAMS.
BY Sydney G. Berry
ATTORNEY

Patented Dec. 11, 1945

2,390,977

UNITED STATES PATENT OFFICE 2,390,977

EVENING ROLL FOR FLOW BOXES

Herman J. Williams, Charleston, S. C., assignor to West Virginia Pulp and Paper Company, New York, N. Y., a corporation of Delaware Application April 16, 1941, Serial No. 388,737

1 Claim. (Cl. 92—44)

My present invention relates to improvements in the flow box of a Fourdrinier paper making machine, and more especially to an improved flow distributing roll in such a box. In the manufacture of paper on the Fourdrinier type of machine it is usual for the stock to be flowed out upon the endless sieve or "wire" by means of one or more flow boxes. For the purpose of maintaining the suspension of fibers and filler, for example, it is common to provide one or more perforated flow distributing rolls in the box which roll is rotated and serves the useful purpose of keeping the fibers and other solid particles of the furnish in a fairly uniform state of suspension.

I have now discovered that greater uniformity will be attained by disposing the roll in bearings which are exterior to the box and by having the roll uniformly perforated over the entire length of the cross-sectional flow area.

Figure 1:
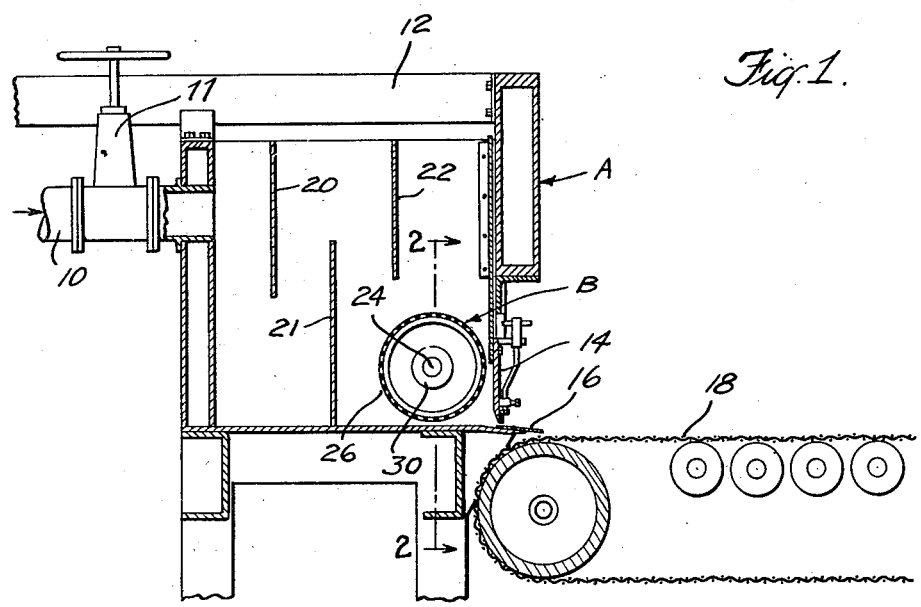
Figure 2:
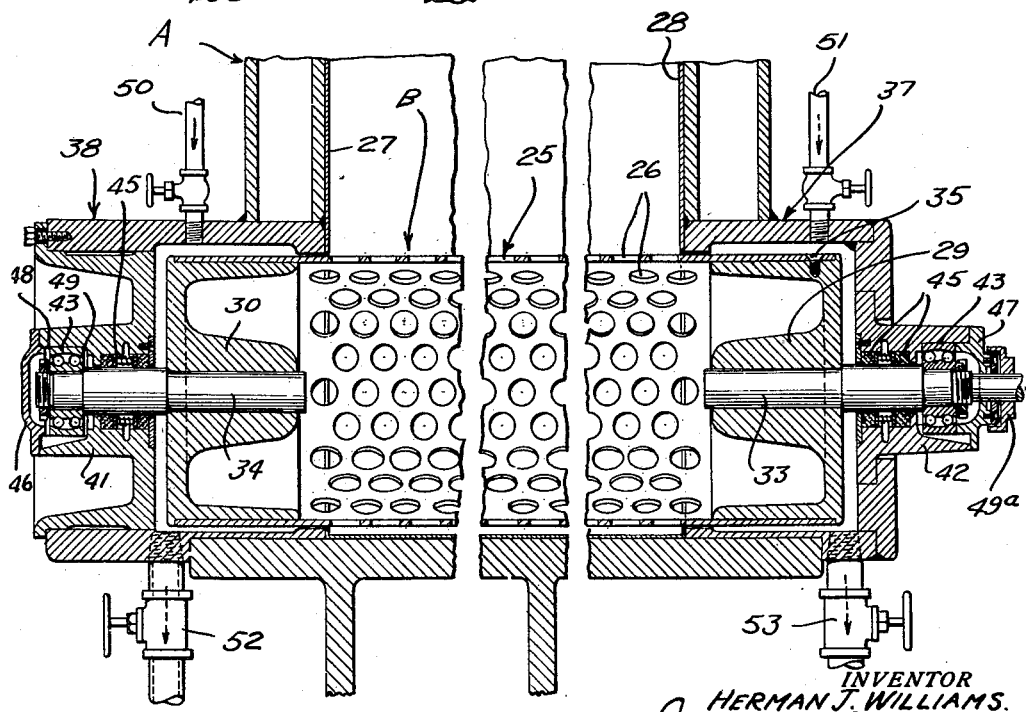

My invention will be best understood by reference to the following detailed description taken with the annexed drawing, in which:

Fig. 1 is a view in vertical longitudinal section of a preferred embodiment, and Fig. 2 is an enlarged view in section taken on line 2—2 of Fig. 1.

Fig. 1 shows a flow box denoted generally by A into which stock is fed through one or more inlet pipes 10 (only one of which is shown) having a valve 11, such box being supported in part by a girder 12. The box has the customary gate or slice 14 of adjustable height, as indicated, and also a lip 16 beneath the slice 14 and defining therewith an opening through which the stock flows out onto the Fourdrinier wire 18. The box contains baffles 20, 21, 22 to break up the velocity of flow.

Disposed rearwardly of the slice is a perforated evener roll denoted generally by B. The roll B comprises a shell 25 having perforations 26, such roll being of a length greater than the internal length of the box, as clearly shown in Fig. 2. In this figure it will be noted that the perforated section of the roll extends beyond the internal surfaces 27, 28 of the box ends. The roll terminates in end portions 29, 30, each of which has secured thereto a stud shaft 33, 34, respectively, and to which the shell 25 is secured, as by means of screws (screw 35).

Roll end 29 is mounted in a housing 37 preferably exterior of the box A, whereas end 30 is likewise mounted in a housing 38 also exterior of the box. Each of said housings comprises a hub 41, 42, respectively, in each of which is contained a ball bearing 43 of the self aligning type as shown for the stud shafts 33, 34. Said hubs 41, 42 also are provided with seals 45, 45 of known type. One of the bearings 43 has a bearing cap 46, whereas said other bearing has a collar 47 through which passes a reduced portion of stud shaft 33 whereby said shaft may have mounted thereon a pulley or other power receiving device, not shown, for the purpose of driving the roll.

Clearances 48, 49 are preferably provided for the left hand bearing 43 to permit of linear expansion of the roll. A flanged collar 49a may also be provided which prevents entry into the bearing of grit or other extraneous matter.

To prevent any flow of stock into the bearings 43, said housings 37, 38 are placed under hydrostatic pressure slightly greater than that obtaining in the box, as by means of intake pipes 50, 51 which cause a continuous flow of water through said housings into the flow box. For the purpose of draining the housings when required, valves 52 and 53 are provided.

It will be seen from the foregoing that by having the housings for the roll ends (which for a long roll must be of substantial size, i. e., five inches in length for a 240 inch wire) exterior to the box A, it is possible to have a length of uniformly perforated roll opposite the entire discharge area of the box, i. e., between the lip 16 and the slice 14. Furthermore, by having hydrostatic pressure within the housings 37, 38, no fiber or filler can have access to the bearings.

I claim:

In a Fourdrinier machine having a flow box, a slice therein defining an opening for the outflow of stock from said box and regulating the flow thereof upon the Fourdrinier wire disposed beneath the box, and a stock flow evening roll disposed rearward of said slice and toward the bottom of said box beneath the normal liquid level therein, the improvement which comprises in combination a perforated flow evening roll longer than the width of said box, such roll having the perforations thereof disposed substantially uniformly over a length of the roll opposite said opening and at least equal to the length of said opening, each end of said roll terminating in a bearing portion of restricted diameter, bearing proper for said bearing portions, each of said bearings proper comprising a housing enclosing an end of the roll but without affording a bearing surface therefor, and means for preventing accumulation of fiber within said housings including means for supplying liquid thereto at a pressure slightly greater than the hydrostatic pressure within said box.

HERMAN J. WILLIAMS.